(12) United States Patent
Wendt (10) Patent No.: US 10,734,846 B2
(45) Date of Patent: Aug. 4, 2020

(54) RADIO-POWER DISTRIBUTION CONTROLLER AND METHOD FOR CONTROLLING RADIO-POWER DELIVERY

(71) Applicant: SIGNIFY HOLDING B.V., Eindhoven (NL)

(72) Inventor: Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/490,695

(22) PCT Filed: Feb. 26, 2018

(86) PCT No.: PCT/EP2018/054610
§ 371 (c)(1),
(2) Date: Sep. 3, 2019

(87) PCT Pub. No.: WO2018/158169
PCT Pub. Date: Sep. 7, 2018

(65) Prior Publication Data
US 2020/0083751 A1 Mar. 12, 2020

(30) Foreign Application Priority Data
Mar. 2, 2017 (EP) ..................... 17158910

(51) Int. Cl.
*H02J 50/20* (2016.01)
*H04W 52/08* (2009.01)
(Continued)

(52) U.S. Cl.
CPC ............. *H02J 50/20* (2016.02); *H02J 7/025* (2013.01); *H02J 50/80* (2016.02); *H04W 52/08* (2013.01); *H04W 52/18* (2013.01)

(58) Field of Classification Search
None
See application file for complete search history.

(56) References Cited

U.S. PATENT DOCUMENTS 5,184,025 A * 2/1993 McCurry ................. G06F 1/28
307/48
8,890,505 B2 * 11/2014 Forbes, Jr. .......... H02J 13/0017
323/318
(Continued)

FOREIGN PATENT DOCUMENTS

| JP | 2012217323 A | 11/2012 |
|----|--------------|---------|
| WO | 2015199466 A1 | 12/2015 |
| WO | 20180037698 A1 | 3/2018 |

OTHER PUBLICATIONS

Vamsi Talla, et al., "Powering the Next Billion Devices With Wi-Fi", ACM CoNext, Dec. 2015, pp. 1-13.
(Continued)

*Primary Examiner* — Lana N Le
(74) *Attorney, Agent, or Firm* — Akarsh P. Belagodu (57) ABSTRACT

A radio-power distribution controller (300) for controlling far-field radio-power delivery from an external radio-power-supply-device (302) to at least one external radio-power receiving device (300) that has a power-converter for converting a received radio-energy amount into an electrical operation power amount for operating the radio-power receiving device is provided and comprises a radio-power monitoring unit (306), which is configured to determine a duration of a received power-delivering radio signal, to determine, an estimate of a received radio-energy amount, which has been received by the radio-power receiving device (300). Upon determining that the estimate of the received radio-energy amount is below a threshold energy amount, it provides a radio-power-shortage signal.

15 Claims, 5 Drawing Sheets

(51) Int. Cl.
*H02J 50/80* (2016.01)
*H02J 7/02* (2016.01)
*H04W 52/18* (2009.01)

(56) References Cited

U.S. PATENT DOCUMENTS

| | | | | |
|---|---|---|---|---|
| 9,787,103 | B1* | 10/2017 | Leabman | H04B 5/0037 |
| 10,033,220 | B1* | 7/2018 | Nguyen | H02J 9/06 |
| 10,122,219 | B1* | 11/2018 | Hosseini | H02J 50/27 |
| 10,122,415 | B2* | 11/2018 | Bell | H04B 5/0037 |
| 2007/0021140 | A1* | 1/2007 | Keyes, IV | H02J 50/20 |
| | | | | 455/522 |
| 2007/0109121 | A1 | 5/2007 | Cohen | |
| 2007/0178945 | A1* | 8/2007 | Cook | H04B 1/1607 |
| | | | | 455/572 |
| 2010/0264746 | A1 | 10/2010 | Kazama et al. | |
| 2010/0315045 | A1* | 12/2010 | Zeine | H02J 7/025 |
| | | | | 320/137 |
| 2011/0016336 | A1* | 1/2011 | Mori | G06F 3/0625 |
| | | | | 713/320 |
| 2011/0156640 | A1* | 6/2011 | Moshfeghi | H02J 50/20 |
| | | | | 320/108 |
| 2012/0119588 | A1 | 5/2012 | Baarman et al. | |
| 2012/0292993 | A1* | 11/2012 | Mettler | H02J 50/00 |
| | | | | 307/25 |
| 2014/0091639 | A1 | 4/2014 | Jung et al. | |
| 2015/0042173 | A1 | 2/2015 | Lee et al. | |
| 2015/0054454 | A1 | 2/2015 | White, II et al. | |
| 2015/0223276 | A1 | 8/2015 | Belogolovy | |
| 2017/0090544 | A1* | 3/2017 | Ajiro | G06F 1/3206 |

OTHER PUBLICATIONS

Kimberley Mok, "Delivering Power with Wi-Fi Signals to the Next Billion Devices, No Batteries Required", Jul. 4, 2015, pp. 1-13.
Emerging Technology from the arXiv, "First Demonstration of a Surveillance Camera Powered by Ordinary Wi-Fi Broadcasts", arXiv, Jun. 3, 2015, pp. 1-4.
Bryce Kellogg, et al., "Passive Wi-Fi: Bringing Low Power to Wi-Fi Transmissions", 13th USENIX Symposium on Networked Systems Design and Implementation (NSDI '16), Mar. 16-18, 2016, pp. 151-164.
Bryce Kellogg, et al., "Wi-Fi Backscatter: Internet Connectivity for RF-Powered Devices", SIGCOMM '14, Aug. 17-22, 2014, pp. 1-12.
Vamsi Talla, et al., "Wi-Fi Energy Harvesting for Battery-Free Wearable Radio Platforms", IEEE International Conference on RFID, 2015, pp. 1-2.

* cited by examiner

RADIO-POWER DISTRIBUTION CONTROLLER AND METHOD FOR CONTROLLING RADIO-POWER DELIVERY

CROSS-REFERENCE TO PRIOR APPLICATIONS

This application is the U.S. National Phase application under 35 U.S.C. § 371 of International Application No. PCT/EP2018/054610, filed on Feb. 26, 2018, which claims the benefit of European Patent Application No. 17158910.4, filed on Mar. 2, 2017. These applications are hereby incorporated by reference herein.

FIELD OF THE INVENTION

The present invention relates to a radio-power distribution controller, to a radio-power network arrangement, to a method for operating a radio-power distribution controller, and to a computer program.

BACKGROUND OF THE INVENTION

US 2010/0264746 A1 describes a wireless power transmitting system that transmits power from a radio-power-supply device to a radio-power receiving device wirelessly. The radio-power receiving device includes a unit receiving power from the radio-power-supply device, a unit obtaining a level of power received through the antenna, a unit obtaining a level of power consumed by the device operating while being supplied with received power and a unit transmitting the received power level and the power consuming level to the radio-power-supply device wirelessly. The radio-power-supply device includes a unit receiving the received power level and the power consuming level from the radio-power receiving device wirelessly, a unit controlling the level of power transmitted through the transmitting antenna based on the difference between the received power level and the received power consuming level, and a unit transmitting power to the radio-power receiving device wirelessly.

SUMMARY OF THE INVENTION

It would be desirable to reduce the complexity of a radio-power receiving device or a radio-power-supply device while making sure that a sufficient amount of radio-power is provided to the radio-power receiving device.

According to a first aspect of the present invention, a radio-power distribution controller is provided, for controlling far-field radio-power delivery from an external radio-power-supply device to at least one external radio-power receiving device that has a power-converter for converting a received radio-energy amount into an electrical operation power amount for operating the radio-power receiving device. The radio-power distribution controller comprises:

a power-requirement unit, which is configured to hold or ascertain for a given radio-power receiving device power-requirement data indicative of a respective threshold energy amount indicative of an energy amount required by the radio-power receiving device for conversion into the electrical operation power amount; and a radio-power monitoring unit configured:
to receive a power-delivering radio signal provided by the external radio-power-supply device;
to determine a duration of the received power-delivering radio signal; and
to determine, using the determined duration, an estimate of a received radio-energy amount, which has been received by the radio-power receiving device with the power-delivering radio signal during its duration; and
to provide a radio-power-shortage signal upon determining that the estimate of the received radio-energy amount is below the threshold energy amount.

The radio-power distribution controller of the present invention achieves a monitoring of the far-field radio-power distribution between at least one external radio-power-supply device and one or more radio-power receiving devices that form nodes of a radio-power network arrangement. Based on determining a duration of the power-delivering signal as received at the radio-power distribution controller, it estimates a received radio-energy amount, which has been received by the one or more radio-power receiving devices with the power-delivering radio signal during its duration. Furthermore, based on power-requirement data pertaining to the respective radio-power receiving device or devices, which indicates a threshold energy amount required at least by the radio-power receiving device for a harvesting, i.e., conversion into an electrical operation power amount, signaling is generated and provided as an output. If the threshold energy amount is estimated as not being reached by the power-delivering radio signal, the radio-power distribution controller provides a radio-power-shortage signal, which may trigger different measures, according to different embodiments that will be described further below. The radio-power distribution controller thus allows reducing the device expenditure in the radio-power-supply device and in the radio-power receiving device. In some embodiments, such devices need not be equipped on their own with a capability for negotiating, monitoring and controlling radio-power supply.

As is known per se, the radio energy provided by the power-delivering radio signal increases with the amplitude of waves, with the spectral width of the frequency spectrum of the power-delivering radio signal and with the length of data packets or powering bursts forming the power-delivering radio signal. Generally, an energy amount of the power-delivering radio signal as received by the radio-power monitoring unit of the radio-power distribution controller may differ substantially from the received radio-energy amount that is actually received by the at least one radio-power receiving device. However, the radio-power distribution controller is based on the recognition that in fact simply harvesting from the power-delivering radio signal the energy that is available at the very location of the radio-power distribution controller, in particular its radio-power monitoring unit, still gives a useful indication of whether the available radio power may provide the radio-power receiving device or devices with the threshold energy amount required by the radio-power receiving device for conversion into the electrical operation power amount. For the invention recognizes that a minimum duration such as a minimum burst length is the parameter of highest significance for successful harvesting. This is based the further recognition that precharging input circuitry of the radio-power receiving devices takes so much time that the duration of the power-delivering radio signal is decisive for successful harvesting. Thus, instead of requiring more elaborate power measurement and evaluation capability determining all parameters defining the radio energy at the location of the radio-power receiving device, the monitoring radio-power monitoring unit is advantageously limited to measuring the duration of the power-delivering radio signal. Putting it in simplified words, the radio-power distribution controller is based on the valid assumption that if the harvested energy is sufficient at the monitoring location it is likely to also be sufficient at the locations of any radio-power receiving device monitored.

The radio-power distribution controller thus comprises the radio-power monitoring unit that is configured to receive, over an air interface, the power-delivering radio signal provided by the external radio-power-supply device. The radio-power monitoring unit allows detecting the power-delivering radio signal provided for powering the external radio-power receiving device. As explained, the radio-power monitoring unit further determines a duration of the received power-delivering radio signal and, using the determined duration, it determines an estimate of a received radio-energy amount, which has been received by the radio-power receiving device with the power-delivering radio signal during its duration.

For allowing the radio-power monitoring unit an assessment whether the estimate of the received radio-energy amount is below the required radio-power amount for conversion into the electrical operation power amount, the radio-power distribution controller further comprises a power-requirement unit that is configured to hold or ascertain power-requirement data allocated to the at least one radio-power receiving device. The power-requirement data is indicative of a respective threshold energy amount indicative of an energy amount required by the radio-power receiving device for conversion into the electrical operation power amount. In determining the required radio-power amount, one may for instance take into account a power requirement of the device, a conversion loss from radio power to electrical power, or other suitable parameters.

The radio-power distribution controller compares the threshold energy amount indicative of the required radio-power amount with the estimate of the received energy amount at the location of the radio-power receiving device. Upon determining that the estimate of the received radio-energy amount is below the threshold energy amount, the radio-power monitoring unit provides a radio-power-shortage signal.

Thus, using the determined duration and power-requirement data, the radio-power distribution controller advantageously uses an estimate of a received radio-energy amount to detect undesired failure situations in radio-power delivery, in which the far-field radio-power delivery from the external radio-power-supply device to the at least one external radio-power receiving device fails to deliver sufficient radio energy required for conversion into the respective required electrical operation power amount. In a radio-power network arrangement, the radio-power-supply device and the at least one external radio-power receiving device do not need specific monitoring, communication and negotiation capability for this purpose and can be provided in a simpler hardware and software configuration than that known from the prior art of US 2010/0264746 A1. This is particularly advantageous and cost-effective in radio-power network arrangements comprising a larger number of network nodes.

In the following, embodiments of the radio-power distribution controller of the first aspect of the present invention will be described.

Generally, the power-delivering radio signal is an electromagnetic signal delivered by the external radio-power-supply device, typically provided in the form of one or more signal bursts with a respective amplitude, duration and frequency spectrum. It may or may not carry protocol information or payload data.

In preferred embodiments, the radio power monitoring unit is configured to provide the radio-power-shortage signal upon determining that the power-delivering radio signal has not exceeded a predetermined minimum duration. The minimum duration is for instance defined as a minimum transmission block time of the power-delivering radio signal. These embodiments are particularly useful as they require low expenditure for remotely detecting transmissions, in which the power-delivering radio signal is too short for allowing a start of power conversion at the radio-power receiving device.

The monitoring unit is in some embodiments configured to determine the estimate of the received radio-energy amount from a power-delivering radio signal in the form of a single signal burst. In other embodiments, the monitoring unit determines the estimate by integrating over a power-delivering radio signal that comprises a plurality of signal bursts. In the latter case, some embodiments of the radio-power distribution controller comprise radio-power monitoring units that determines the estimate of the received radio-energy amount by further taking into account an estimate of energy loss that is predicted to occur at the external radio-power receiving device, during reception of the power-delivering radio signal or during a time span of "silence" between individual signal bursts of the power-delivering radio signal, or, preferably, taking into account both time spans of reception as well as any time span of "silence".

There are known concepts of radio-power transmission, called Power over WiFi (PoWiFi), to which the present invention can provide a valuable and innovative contribution. Radio communication typically follows a known communication protocol used to exchange data between the radio-power-supply device and the radio-power receiving device, and allows deriving information regarding a source node and one or more destination nodes of the communication. In some embodiments, data communication is performed using technology standards other than that used for the power-delivering radio signal. In one variant, information received through the data communication is used by the monitoring unit for maintaining a list of currently active radio-power receiving devices to be monitored. Suitably, the monitoring unit is configured to restrict performing its monitoring functions only to currently active radio-power receiving devices, and to interrupt monitoring radio-power delivery to any radio-power receiving device that is currently not on this list. Removal from this list may be triggered based on scheduling information provided by the power-requirement unit and defining a schedule of active and inactive times of the radio-power receiving device, or using a respective predetermined time span of inactivity. Such measures achieve an efficient monitoring of the power distribution to a larger number of radio-power receiving devices.

The radio-power shortage signal can be provided under different predetermined conditions, according to different embodiments which will be described in the following.

A single signal burst often does not provide sufficient energy for operation of a radio-power receiving device. Also, harvested energy typically dissipates, even from energy storage devices, governed by a certain time constant. In some embodiments of the radio-power distribution controller, the power-requirement data is therefore further indicative of a threshold aggregated energy amount to be received by the respective radio-power receiving device in a predetermined energy-harvesting time span. The threshold aggregated energy amount is an energy amount to be harvested in the predetermined energy-harvesting time span and sufficient for operating the radio-power receiving device over a predetermined operational time span, taking into account energy dissipation effects. This embodiment thus allows taking into account the radio energy provided by any number of individual signal bursts detected within the energy-harvesting time span, and an estimate of energy dissipation effects occurring at the radio-power receiving device.

In these embodiments, thus, the radio-power monitoring unit is preferably configured to provide the radio-power-shortage signal also upon determining that the estimate of the received radio-energy amount is below the threshold aggregated energy amount. These embodiments are particularly advantageous for use with external radio-power receiving devices which are known to require a predetermined amount of energy to operate during a predetermined operational time span.

Thus, in case of insufficient radio-power delivery, the radio power shortage signal can be provided after predetermined time intervals or at predetermined discrete points in time only, depending on the monitoring policy employed.

As an alternative, or in combination with that, in some embodiments of the radio-power distribution controller the radio-power monitoring unit is configured to determine, during the reception of the power-delivering-radio signal, preferably in a continuous or quasi-continuous manner, a time-integrated received radio-energy amount. The provision of the radio-power shortage signal depends here on a current state of energy delivery during the reception of the power-delivering radio signal. Thus, the radio-power monitoring unit provides the radio-power-shortage signal as long as the time-integrated received radio-energy amount is below the threshold energy amount, and stops providing the radio-power shortage signal only upon determining that the time-integrated received radio-energy amount has reached the threshold energy amount.

In these embodiments, the energy amount of the power-delivering radio signal that is received by the radio-power monitoring unit is thus determined either continuously or at a predetermined sampling frequency. To make a rough estimate of energy dissipation at the radio-power receiving device, the radio-power monitoring unit is in some of these embodiments configured to set the time-integrated received radio-energy amount to zero upon detecting that the power-delivering radio signal is no longer received, for example in time spans between individual signal bursts.

Further consideration of dissipation effects is made in other embodiments, wherein the radio-power shortage signal is additionally provided by the radio-power monitoring unit upon determining that no power-delivering radio signal has been received for a predetermined maximum silence time span. An extreme example corresponding to the above rough estimate of energy dissipation is a setting of the predetermined maximum silence time span to zero, meaning that the radio-power-shortage signal is provided as soon as the power-delivering radio signal is not received. In other examples, setting the predetermined maximum silence time span to non-vanishing time values prevents the provision of the radio-power-shortage signals in situations where the power-delivery radio signal comprises signal bursts separated by silence time spans shorter than the maximum silence time span.

In other embodiments, the power requirement data held by the power requirement unit allocates different required radio-power amounts to different times of operation of the radio-power receiving device. Preferably, the power requirement unit is configured to provide to the radio-power monitoring unit that power-requirement data which is allocated to the current time. This is particularly advantageous when the operation of the radio-power receiving device follows a predetermined schedule of operation times. In these embodiments, if the operation of the radio-power receiving devices is for example limited to a certain time of the day, and/or certain days of the week, or any other timely pattern or schedule, the power requirement data includes information pertaining to the scheduled operation times.

These embodiments are also advantageous for using in combination with external radio-power receiving devices that are configured to operate with a predetermined operation frequency. A non-limiting example of such a device is a sensor configured to acquire information regarding a given physical quantity with a predetermined operation frequency (e.g. once every 30 seconds). In these cases, the radio-power distribution controller can be advantageously configured to not provide the radio-power shortage signal during a given time span at which the radio-power receiving device is not expected to operate (i.e., in dependence on a first required radio-power amount that can be set to zero and that is allocated to a first operation time), but provide it during a second time span (i.e., in dependence on a second required radio-power amount allocated to a second operation time). For example, if the first required radio-power amount is set to zero over a first operation time, a radio-power monitoring unit configured to compare the estimate of the received radio-energy amount with a threshold energy amount indicative of the first required radio-power amount (in this case zero) will not provide the radio-power shortage signal during the first operation time. The second operation time, where the second—non vanishing—radio-power amount is required for operation, is advantageously configured to start shortly before the radio-power receiving device is expected to operate, in order to allow the external radio-power receiving device to convert a sufficient amount of radio-power into the required electrical operation power amount that is needed for its operation. Other examples where these embodiments are advantageous include its use with external devices which have a sleep mode operation. Sleep mode operation typically requires much less power than normal operation, which can be taken into consideration by suitable power-requirement data. As already mentioned before, when no power is required, the radio-power monitoring unit may be configured to determine the estimated radio-power amount only during the expected operation times.

In other embodiments, the radio-power-shortage signal is used to inform an external unit or user about a current status of radio-power delivery from the radio-power-supply device to the at least one radio-power receiving device. In some of these embodiments, the external unit to be informed is the radio-power-supply device. These embodiments advantageously allow partly or fully replacing a direct negotiation between the radio-power-supply device and the radio-power receiving device by a higher-level control instance formed by the radio-power distribution controller. Suitably, thus, the radio-power distribution controller additionally assumes control functionality in these embodiments and further comprises a transmitter unit, which is configured to transmit control messages to the external radio-power-supply device via a communication interface; and a control unit, which is configured, upon reception of the radio-power-shortage signal, to generate and provide to the transmitter unit a power control message instructing the external radio-power-supply device to provide additional radio power to the at least one external radio-power receiving device.

The power control message instructing to provide additional radio power can be specified in different ways, for instance by instructing the radio-power-supply device to provide a power-delivering radio signal having a longer time span (i.e. a longer duration), a higher transmission power level at a given frequency, or having a wider frequency spectrum. Of course, the respective measures can be combined.

Suitably the monitoring unit is configured to determine a currently available capacity of the air interface to transport additional radio-power or energy to radio-power receiving devices in view of the current usage of the air interface by the network. In particular, the monitoring unit may be configured to determine spectral ranges available for radio-power transmission.

In other embodiments the radio-power-shortage signal is provided as an output to an external unit in the form of a control panel that has a user interface and is enabled to provide information pertaining to the current status of radio-power delivery.

In other embodiments, the radio-power-shortage signal is used internally by the radio-power distribution controller. In one of these embodiments, the radio-power distribution controller further comprises a backup radio-power-supply unit configured to provide, upon provision of the radio-power-shortage signal, a backup radio-energy amount to the radio-power receiving device via an air interface. The backup-radio-power supply unit is thus configured to provide a backup radio-power delivering signal with the backup radio-energy amount in reaction to the radio-power-shortage signal. In these embodiments, whenever the radio-power shortage signal is provided, the backup radio-power supply unit provides the backup radio-energy amount as an additional radio energy amount for harvesting by the radio-power receiving device requiring more energy. The backup radio-energy amount thus adds to the radio-energy amount received by the radio-power receiving device from the radio-power-supply device, and supports power conversion into the full required electrical operation power amount.

Preferably, the provision of the backup radio-energy amount is triggered only upon determining that the power-delivering radio signal is currently not received.

The radio-power monitoring unit is in other embodiments configured to iterate the determination of the estimate of the received radio-energy amount, and of whether or not the estimate is below the required radio-power amount upon the provision of the radio-power-shortage signal. This may be repeated until the monitoring process does not anymore provide the radio-power-shortage signal. This way, it can be achieved that the amount of backup radio-energy amount increases from an initial backup radio-energy amount until the radio-power-shortage signal is no longer provided. This ensures that the provided backup radio power is provided in an amount that is sufficient to complement the received radio-energy amount and enable conversion into the electrical operation power amount actually required by the radio-power receiving device.

In other embodiments, the radio-power monitoring unit is further configured to output a sufficient-power signal upon determining that the estimate of the received radio-energy amount is equal to or higher than the threshold energy amount indicative of a required radio-power amount. In response, the radio-power distribution controller is preferably configured to instruct the radio-power-supply device to decrease the currently transmitted radio-power amount until the sufficient-power signal is no longer provided. Additionally or alternatively, the backup radio-power supply unit is configured to decrease or completely switch off backup radio-power delivery until the sufficient-power signal is no longer provided.

The backup radio-energy amount is in some embodiments delivered as a radio carrier signal of a predetermined main frequency component, whereas in other embodiments the backup radio-energy amount is delivered as communication data according to a given communication protocol used to exchange the communication data between the radio-power-supply device and the radio-power receiving device.

In other embodiments, the radio-power distribution controller further comprises a power supply unit, which is configured to receive electrical power via a wired power network. The radio-power distribution controller is configured to be operated using the received electrical power. This way, the power supply to the radio-power distribution controller is particularly reliable, in correspondence with the important monitor and/or control function that the radio-power distribution controller assumes.

The radio-power distribution controller may thus be provided as a separate individual device. However, some application scenarios provide the radio-power distribution controller as an integrated component of an application device. Such embodiments further comprise an application unit configured to perform an application function and to be operated using the received electrical power. Non-limiting examples of such application units are electrical appliances and luminaires.

In some embodiments, the radio-power distribution controller further comprises a location unit connected to the radio-power monitoring unit and configured to hold or ascertain position data pertaining to relative positions of the radio-power-supply device, the radio-power distribution controller and the at least one radio-power receiving device. The radio-power monitoring unit is in these embodiments configured to determine, using the position data and the reference radio-energy amount, an estimated radio-energy amount that forms an estimate of a radio-energy received by the at least one radio-power receiving device. Due to the physics involved in radio transmission, the received radio-energy amount also depends on the distances of the radio-power receiving devices from the radio-power-supply device, and on the physical environment, such as the presence of walls or other objects that may attenuate or reflect the power-delivering radio signal.

According to a second aspect of the present invention, a radio-power network arrangement is presented. The radio-power network arrangement comprises:

at least one radio-power receiving device, which comprises a receiver configured to receive a power-delivering radio signal, and which comprises a power-converter for converting a received radio-energy amount into an electrical operation power amount for operating the radio-power receiving device;

a radio-power-supply device for providing the power-delivering radio signal to the at least one radio-power receiving device;

a radio-power distribution controller according to the first aspect of the invention or one of its embodiments, which is arranged remotely from the radio-power-supply device and from the at least one radio-power receiving device.

Different embodiments of the radio-power network arrangement of the second aspect of the present invention share the additional features and advantages of the different embodiments of the radio-power distribution controller of the first aspect of the invention.

In some embodiments the radio-power receiving devices directly use the electrical operation power amount for operating the radio-power receiving devices. In other embodiments, the electrical operation power amount is stored in energy storage devices such as batteries or a capacitor.

In some radio-power receiving devices, during the reception of the power-delivering radio signal, an input capacitor gets charges through an input rectifier. The capacitor voltage can be used as a basis for a next stage of the radio-power receiving device such as a DC/DC pump or converter allowing the provision of an operation voltage. For these radio-power receiving devices in particular it is crucial to ensure that the received radio-energy amount is enough to allow the input rectifier to charge the input capacitor up to a charge where the DC/DC converter is able to provide the operation voltages, even in view of energy dissipation effects occurring in the radio-power receiving device. The radio-power distribution controller is therefore advantageously configured to instruct the radio-power-supply device to continue the provision of the power-delivering radio signal up to a minimum duration or, in some embodiments, to provide the backup-radio-energy amount until the necessary received radio-energy amount is estimated to have been received. For a given frequency band of the power-delivering radio signal and for a predetermined radio-power receiving device, there is therefore a minimum duration of the power-delivering radio signal that is required by the DC/DC pump or converter to start the provision of the operation voltage.

Other embodiments of the radio-power network arrangement comprise a radio-power distribution controller with a transmitter unit, which is configured to transmit control messages to the external radio-power-supply device via a communication interface, and with a control unit, which is configured, upon reception of the radio-power-shortage signal, to generate and provide to the transmitter unit a power control message instructing the external radio-power-supply device to provide additional radio power to the to at least one external radio-power receiving device. In such embodiments, the radio-power-supply device preferably further comprises:

a radio-power delivery unit configured to generate and transmit the power-delivering radio signal comprising radio energy of a controllable amount; and a radio-power control unit configured to control the amount of radio energy in response to a control message received from the radio-power distribution controller by modifying a radio-power level provided by the power-delivering radio signal or a duration of the power-delivering radio signal or a frequency range covered by the power-delivering radio signal.

Some embodiments of the radio-power network arrangement are configured to operate under a so-called "Passive-WiFi" mode enabling particularly low power consumption in performing WiFi transmissions. In such embodiments, the radio-power-supply device advantageously comprises:

a radio-frequency-signal supply unit configured to provide a primary power-delivering radio signal as a radio-carrier signal of a frequency outside a radio frequency band to be used for data communication within the radio-power network arrangement; and a backscattering frequency modulation unit configured to:
receive and modulate the received radio-carrier signal to backscatter a frequency modulated secondary power-delivering radio signal at the radio frequency band to be used for data communication within the radio-power network arrangement.

In these embodiments, the receiving unit of the radio-power distribution controller is preferably configured to receive either only the primary power-delivering radio signal or both the primary and secondary power-delivering radio signal. Furthermore, the power-converter of the at least one radio-power receiving device is configured to convert the received radio-energy amount of either only the primary power-delivering radio signal or both the primary and secondary power-delivering radio signal into the electrical operation power amount for operating the radio-power receiving device.

The secondary power-delivering signal is usually in the frequency range support by a given WiFi standard used for data communication within the radio-power network arrangement. To enable such communication by the radio-power receiving devices using the secondary power-delivering radio signal, the at least one radio-power receiving device comprises a baseband modulation unit, which is connected to the receiver and configured to modulate the secondary power-delivering radio signal using a baseband signal provided internally. The receiver of the radio-power receiving device is further configured to backscatter the modulated secondary power-delivering radio signal.

Thus, the radio-power receiving devices is operated as a passive-WiFi-device for communication of data according to a predetermined communication protocol that uses the radio frequency band to be used for data communication (e.g. 2.4 GHz or 5 GHz in the case of the IEEE 802.11 communication protocols).

According to a third aspect of the present invention, a method for operating a radio-power distribution controller in controlling far-field radio-power delivery from an external radio-power-supply device to at least one external radio-power receiving device that has a power-converter for converting a received radio-energy amount into an electrical operation power amount for operating the radio-power receiving device, the method comprising:

providing, for a given radio-power receiving device, power-requirement data indicative of a respective threshold energy amount indicative of an energy amount required by the radio-power receiving device for conversion into the electrical operation power amount;

receiving a power-delivering radio signal provided by the external radio-power-supply device;

determining a duration of the received power-delivering radio signal;

determining, using the determined duration, an estimate of a received radio-energy amount, which has been received by the radio-power receiving device with the power-delivering radio signal during its duration; and upon determining that the estimate of the received radio-energy amount is below the threshold energy amount, providing a radio-power-shortage signal.

The method of the third aspect shares the advantages of the radio-power distribution controller of the first aspect.

According to a forth aspect of the present invention, a computer program is provided that comprises executable code for executing the method of the third aspect or one of its embodiments when executed by a processor of a computer.

It shall be understood that the radio-power distribution controller of claim 1, the radio-power network arrangement of claim 8, the method for operating a radio-power distribution controller of claim 12, and the computer program of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
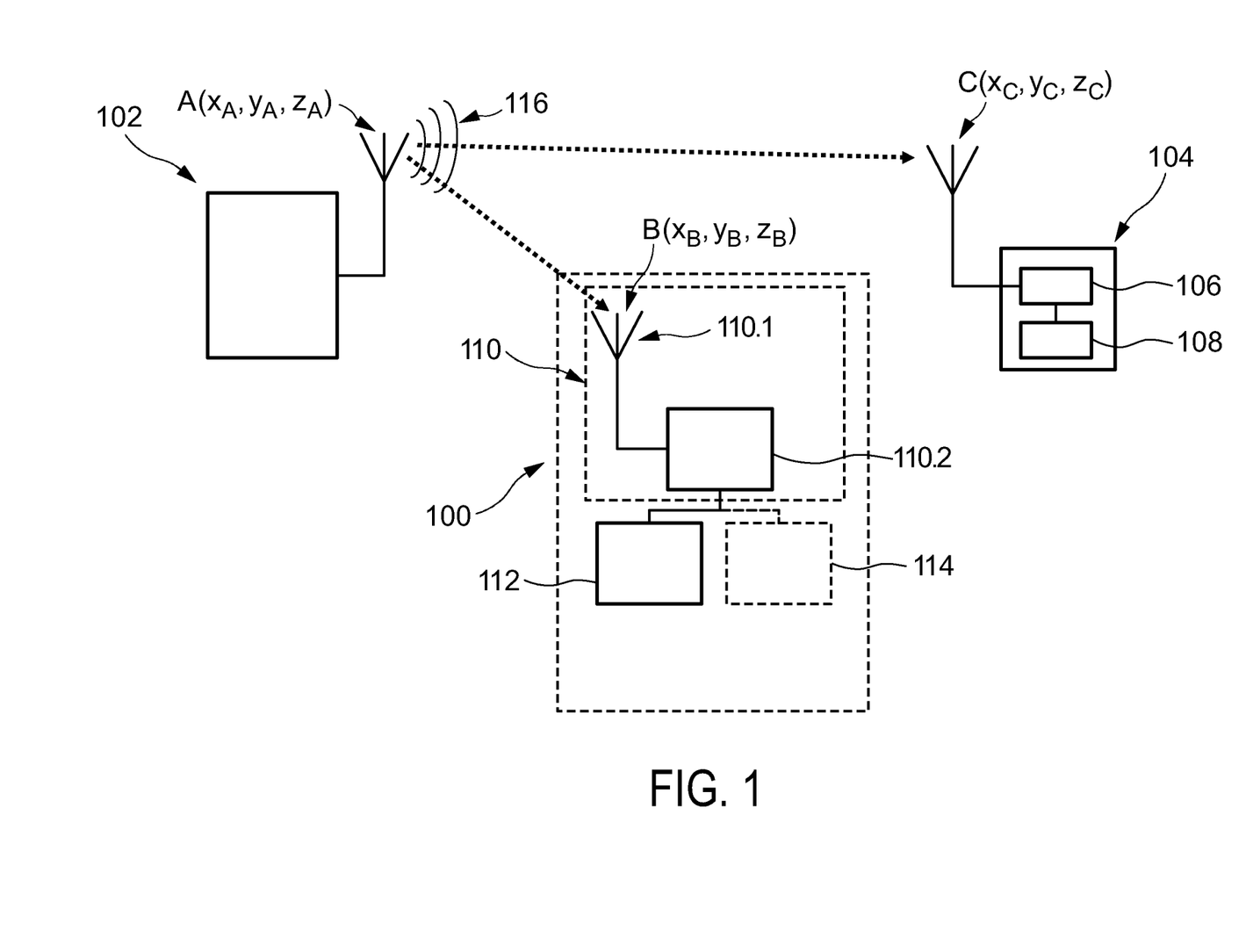
FIG. 1 shows an embodiment of a radio-power network arrangement including a radio-power-supply device, a radio-power receiving device and a radio-power distribution controller.

FIG. 1 shows an embodiment of a radio-power distribution controller 100 for controlling far-field radio-power delivery from an external radio-power-supply device 102 to at least one external radio-power receiving device 104. The radio-power receiving device 104 is for example a presence sensor, a temperature sensor, a light-level sensor, a camera, a battery charger or another type of device that can be powered by converted radio-power. The radio-power receiving device 104 comprises a power-converter 106. The power-converter 106 is configured to convert a received radio-energy amount into an electrical operation power amount to be used for operating the radio-power receiving device 104. In particular, the radio-power receiving device 104 comprises electrically driven components 108 that can be operated using the converted electrical operation power amount.

The radio-power receiving device 104 may comprise electrically driven components which are configured to be operated directly using the converted electrical operation power, in particular using only the converted electrical operation power currently provided. Other radio-power receiving devices are configured to store the received radio-energy amount in an energy storage unit, and use the stored energy for driving operation of the components. In other words, electrical operation power can be obtained by either directly converting-and-providing the received radio-energy amount to the electrical components or by storing a converted electrical power amount in an energy storage unit such a capacitor or a battery that are charged by converted radio-power.

In some radio-power receiving devices, during the reception of the power-delivering radio signal, an input capacitor gets charges through an input rectifier. The capacitors voltage is the basis for a next stage of the radio-power receiving device to start operation, which is mostly in the range of 0.6-1V. This stage is, in some radio-power receiving devices, a DC/DC pump to move the harvested energy up into the capacitor which will be powering the operation of the device from an operation voltage, such as, for example, 3.3V. So if transmissions are to short the delivered energy through this chain is to small as long as the DC/DC pump can not deliver further, all the energy will be lost in leakages in the circuitry inside the radio-power receiving device The radio-power distribution controller 100 comprises a radio power monitoring unit 110 configured to receive a power-delivering radio signal 116. The radio power monitoring unit 110 comprises an antenna 110.1 as a receiving unit suitably configured to allow radio signal reception covering a full spectrum of radio frequencies used for far-field radio-power delivery from the radio-power-supply device 102 to the radio-power receiving device 104 in a given network arrangement. The frequency spectrum is typically partitioned into pre-defined frequency channels. This can be advantageously used for adjusting radio-power delivery in a controlled channel-selective manner. The radio-power monitoring unit also comprises a monitoring unit 110.2 that determines a duration of the received power-delivering radio signal. It further determines, using the determined duration, an estimate of a received radio-energy amount, which has been received by the radio-power receiving device 104 with the power-delivering radio signal during its duration.

A power requirement unit 112 is configured to hold or ascertain for a given radio-power receiving device 104 power-requirement data indicative of a respective threshold energy amount indicative of an energy amount required by the radio-power receiving device for conversion into the electrical operation power amount. In cases where the radio-power-supply device is configured to provide radio-power to a plurality of radio-power receiving devices, the power requirement unit is configured to hold or ascertain power-requirement pertaining to each of the radio-power receiving devices or to a given subset thereof. In an exemplary embodiment, the radio-power receiving device 104 requires an electrical operation power amount of 10 mW power for operation, and the power-converter 106 has a conversion efficiency of 90%. This means that the required radio-power amount is approximately 11.11 mW. Thus, the power-requirement data is in this case indicative of the 11.11 mW radio-power amount necessary for the operation of the radio-power receiving device. The radio-power monitoring unit 110 is then further configured to provide a radio-power-shortage signal upon determining that the estimate of the received radio-energy amount is below the threshold energy amount.

Some radio-power distribution controllers additionally comprise a location unit 114 which is configured to hold or ascertain position data pertaining to relative positions of the radio-power-supply device, the radio-power distribution controller and the at least one radio-power receiving device. In this particular case, the position data pertains to the relative positions A, B and C of the radio-power-supply device 102, the radio-power distribution controller 100 and the at least one radio-power receiving device 104. By knowing the relative positions of these devices in a three dimensional coordinated space, the distance between the devices (e.g. $d_{AB}$, $d_{BC}$ and $d_{AC}$) can be directly calculated using basic geometry rules.

In cases where the radio-power distribution controller comprises the location unit 114, the radio-power monitoring unit 110 is further configured to determine a reference radio-power amount of the power-delivering radio signal received by the receiving unit 110.1, to determine, using the position data (held or ascertained by the location unit 114) and the reference radio-power amount, an estimated radio-power amount that is estimated to be received by the at least one radio-power receiving device 104. Then, upon determining that the estimated radio-power amount is below the required radio-power amount, it is configured to provide a radio-power-shortage signal. Some radio-power distribution controllers are also configured to provide a sufficient radio-power signal when the estimated radio-power amount is equal to or higher than the required radio-power amount.

Due to the physics involved in radio transmission, the reference radio-power amount and the received radio-energy amount depend on the radio-power amount of the power-delivering signal as provided by the radio-power-supply device, on the distance between the radio-power-supply device and the radio-power distribution controller and the radio-power receiving device, respectively, and on the physical environment; for example on the presence of walls or other objects that may attenuate or reflect the power-delivering radio signal.

In cases where the radio-power-supply device is configured to provide power to a plurality of radio-power receiving devices, the radio-power-shortage signal is provided when at least one of the radio-power receiving devices is estimated to receive an amount of radio-power that is not sufficient for conversion into the electrical operation power amount.

It is noted that typically the duration of the received power delivering radio signal and the frequency band in which the power delivering radio signal is transmitted can be clearly measured at the position of the radio power distribution controller. The estimation in this case relates to whether or not the far field radio power will be sufficient to power all radio-power receiving devices.

Some radio power network arrangements are further configured to be operated in a so-called calibration mode that comprises a learning phase. During the learning phase, the radio-power-supply device provides the power-delivering radio signal in the form of short packets or signal bursts, and checks whether or not the radio-power receiving devices have received enough radio power for its operation. The radio-power-supply device then increases the duration of the power-delivering radio signal in steps, until all or a given subset of radio-power receiving devices have received enough radio power for operation. To this end, as a non-limiting example, a radio-power receiving device can be configured to provide a power-up signal upon having received enough radio power for its operation. The radio-power-supply device or the radio-power distribution controller may, upon reception of the power-up signal, then note this the current duration of the power-delivering radio signal as the required minimum duration, to which in some cases a security power margin is added to ensure proper functioning of the radio-power receiving devices.

The radio-power shortage signal can be provided in different ways. In a particularly simple variant, the radio-power shortage signal solely indicates that at least one of the radio-power receiving devices monitored by the radio-power distribution controller is estimated to be receiving an amount of radio-power amount that after conversion to the electrical operation power amount is not sufficient for operating the radio-power receiving device. In another variant, the radio-power shortage signal comprises further power-shortage data indicative of a difference amount of radio-power that must be added to a currently and/or previously transmitted radio-power amount in order to cross the required threshold. In yet another variant, radio-power shortage signal additionally provides an indication of radio frequency channels that have been evaluated in determining the estimated radio-power amount. In other embodiments, the radio-power shortage signal includes a power-control message instructing the radio-power-supply device to provide additional radio power to the at least one external radio-power receiving device.

Figure 2:
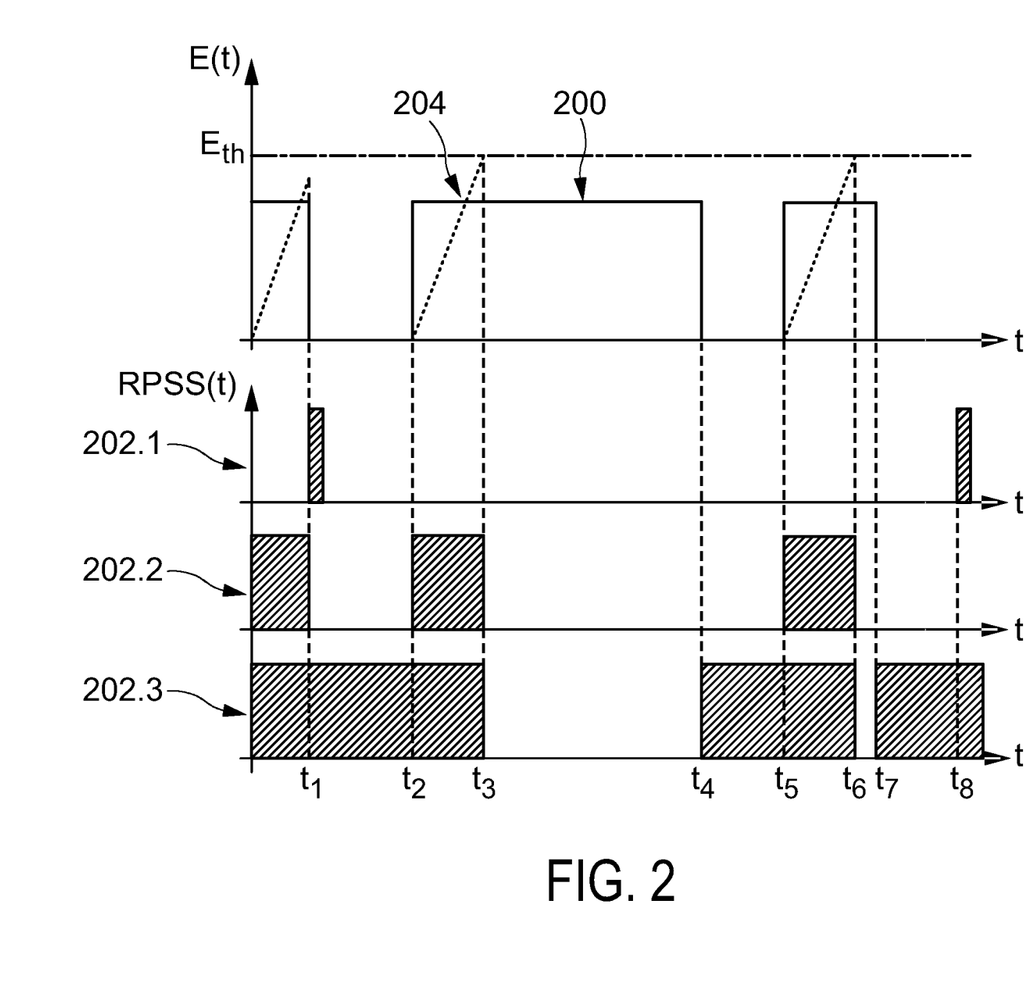
FIG. 2 shows an exemplary power-delivering radio signal and three different variants of radio-power shortage signals provided by three alternative embodiments of the radio-power distribution controller of FIG. 1.

FIG. 2 shows an exemplary power-delivering radio signal 200 received at the radio-power monitoring unit of a radio power distribution controller, and represented as the received radio-energy amount plotted versus time E(t). It further shows three different radio-power shortage signals (RPSS(t)), 202.1, 202.2 and 202.3 provided by three different radio-power distribution controllers in response to the reception of the power-delivering signal 200. All graphs in FIG. 2 share the same time axis. The power-delivering signal 200 comprises three signal bursts that start at t=0, $t_2$ and $t_5$ and that have three respective durations, namely $t_1$, $t_4$-$t_2$ and $t_7$-$t_5$. The signal bursts are separated by respective silence time spans, namely $t_2$-$t_1$ and $t_5$-$t_4$. The dotted line 204 shows the received radio-energy amount comprised by the power-delivering radio signal received at the radio-power monitoring unit until a time-integral of the received radio-energy amount reaches the energy value $E_{th}$, which is a threshold energy amount indicative of an energy amount required by the radio-power receiving device for conversion into the electrical operation power amount.

One exemplary radio-power distribution controller is configured to provide the radio-power-shortage signal 202.1 in response to receiving the power-delivering radio signal 200. The monitoring unit of that particular unit determines the duration of the first burst of the power-delivering radio signal and determines an estimate of a received radio-energy amount, which has been received by the radio-power receiving device with the power-delivering radio signal during its duration. Since the value of that estimate at $t_1$ is below the threshold energy amount $E_{th}$, the radio power monitoring unit provides the radio-power-shortage signal at $t_1$ or shortly thereafter, depending on a response time of the power-requirement unit. This radio-power-shortage signal is used to indicate, internally or to an external radio-power-supply device that the signal burst received had an energy amount lower than the threshold energy amount $E_{th}$. When the second signal burst, which has a duration $t_4$-$t_2$ is received at $t_2$, the received radio-energy amount reaches the threshold energy amount at time $t_3$. The power monitoring unit still keeps track of the received radio-energy amount comprised by the signal burst. When the burst is not longer received (i.e. at $t_4$), the radio-power monitoring unit updates the estimate of the received radio-energy amount by taking into account expected energy losses that are expect to occur at the radio-power receiving devices, due to, for example, leakages in the circuitry or to a consumption of the received and converted energy for its operation. In this case, during the silence time span between $t_4$ and $t_5$, these expected losses do not bring the value of the estimate of the received radio-energy amount below the threshold energy amount $E_{th}$ and no radio-power-shortage signal is provided between $t_4$ and $t_5$. After a given silence time span, another burst is received at $t_5$. The estimate of the received radio-energy amount is updated according to the energy amount of the third signal burst. However, this time, after the third burst ends at $t_7$, the estimate is further updated in dependence of the expected losses as described above, and, only at a time $t_8$, the estimate of the received radio-energy amount has a value lower than the threshold energy amount. This triggers again the provision of the radio-power-shortage signal 202.1 at $t_5$ or shortly thereafter.

In other cases, the threshold energy amount $E_{th}$ is regarded as a threshold aggregated energy amount, which is indicative of a sufficient energy amount for operating the radio-power receiving device over a predetermined operational time span. In this case, the estimate of the received radio-energy amount is compared to the threshold aggregated energy amount. The radio-power-shortage signal is provided in this case upon determining that the energy amount received by the radio-power receiving device might not be sufficient to operate said device over the whole predetermined operational time span.

A second exemplary radio power distribution controller is configured to provide the radio-power-shortage signal 202.2 based on the reception of the power-delivering radio signal 200. The radio power monitoring unit is in this case configured to determine, during the reception of the power-delivering-radio signal, a time-integrated received radio-energy amount and to provide the radio-power-shortage signal as long as the time-integrated received radio-energy amount is below the threshold energy amount, and to stop providing the radio-power shortage signal upon determining that the time-integrated received radio-energy amount has reached the threshold energy amount. The radio-power monitoring unit is in this case configured to determine the time integrated received radio-energy amount that is received with a respective burst and sets this amount to zero when the burst ends. Therefore, and according to this particular radio power distribution controller, the radio power monitoring unit receives a first burst of the power-delivering radio signal 200 at t=0, determines the time integrated received radio-energy amount either continuously or by sampling the received energy at a predetermined suitable sampling frequency. During the reception of the first burst the time integrated received radio-energy amount does not reach the threshold energy amount during the duration of the signal burst and the power monitoring unit provides the radio-power-shortage signal 202.2. This provision ends in this case at the time $t_1$ where the first signal burst is no longer received. When the second burst is received, a determination of the time integrated received radio-energy amount starts again and the radio-power-shortage signal is again provided until the time integrated received radio-energy amount reaches the threshold energy value at $t_3$. In a similar way, the radio-power-shortage signal 202.2 is provided at times between $t_5$ and $t_6$. Some other embodiments of radio-power distribution controllers are configured to additionally provide the radio-power-shortage signal provided upon determining that no power-delivering radio signal has been received for a predetermined maximum silence time span. Radio-power-shortage signal 202.3 is an example of a signal provided by a radio-power distribution controller wherein the predetermined maximum silence time span is set to zero. As a result, these radio-power distribution controllers additionally provide, (in addition to signal 202.2) the radio-power-shortage signal when no power-delivering radio signal is received, i.e., during the silent time spans between $t_1$ and $t_2$, between $t_4$ and $t_5$ and from $t_7$ onwards. The resulting radio-power-shortage signal is given by signal 202.3.

Figure 3:
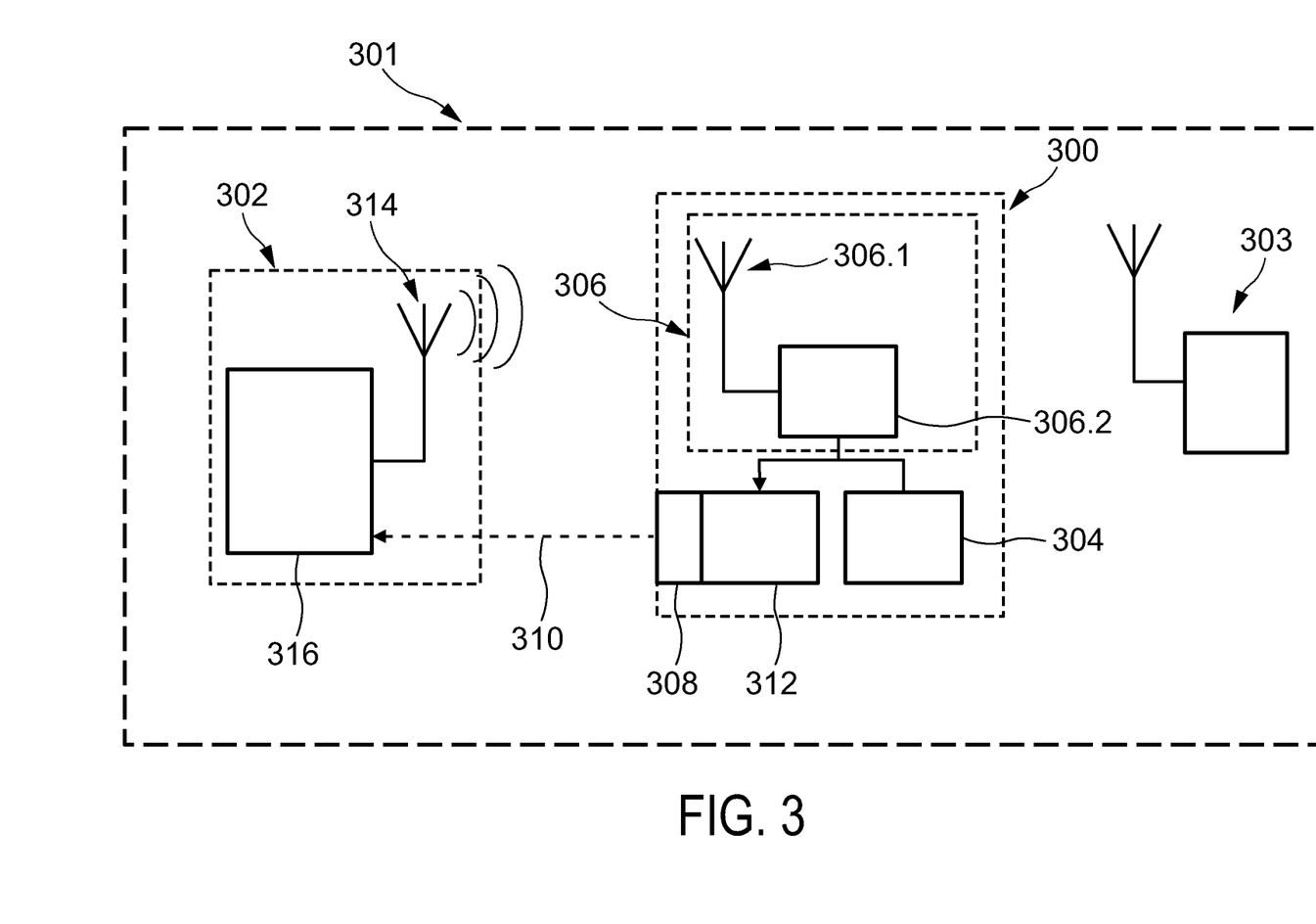
FIG. 3 shows another exemplary radio-power network arrangement.

FIG. 3 shows an exemplary embodiment of a radio-power distribution controller 300 for controlling far-field radio-power delivery from an external radio-power-supply device 302 to an external radio-power receiving device 303. The radio-power distribution controller comprises a power requirement unit 304 is configured to hold or ascertain for a given radio-power receiving device (not shown) power-requirement data indicative of a respective threshold energy amount indicative of an energy amount required by the radio-power receiving device for conversion into the electrical operation power amount. It also comprises a radio power monitoring unit 306 that comprises an antenna 306.1 as a receiving unit. The receiving unit is suitably configured to allow radio signal reception covering a full spectrum of radio frequencies used for far-field radio-power delivery from the radio-power-supply device 302. The radio-power monitoring unit 306 also comprises a monitoring unit 306.2 which determines a duration of the received power-delivering radio signal, and, using the determined duration, it further determines an estimate of a received radio-energy amount, which has been received by an external radio-power receiving device 303 with the power-delivering radio signal during its duration. The radio-power monitoring unit 306 also provides a radio-power-shortage signal upon determining that the estimate of the received radio-energy amount is below the threshold energy amount.

The radio-power distribution controller further comprises a transmitter unit 308, which is configured to transmit control messages 310 to the external radio-power-supply device via a communication interface, and a control unit 312, which is configured, upon reception of the radio-power-shortage signal, to generate and provide to the transmitter unit the radio-power shortage signal including a power control message instructing the external radio-power-supply device to provide additional radio power to the external radio-power receiving device 303.

The radio-power-supply device 302 includes a radio-power delivery unit 314 configured to generate and transmit over an air interface the power-delivering radio signal comprising radio energy of a controllable amount. The radio-power-supply device also comprises a radio-power control unit 316 configured to control the amount of radio energy in response to the control message 310 received from the radio-power distribution controller 300. This is achieved either by modifying a radio-power level provided by the power-delivering radio signal or a duration of the power-delivering radio signal or a frequency range covered by the power-delivering radio signal, or any combination thereof. The radio-power distribution controller 300, the radio-power-supply device 302 and the radio-power receiving device 303 form an exemplary embodiment of a radio-power network arrangement 301.

Figure 4:
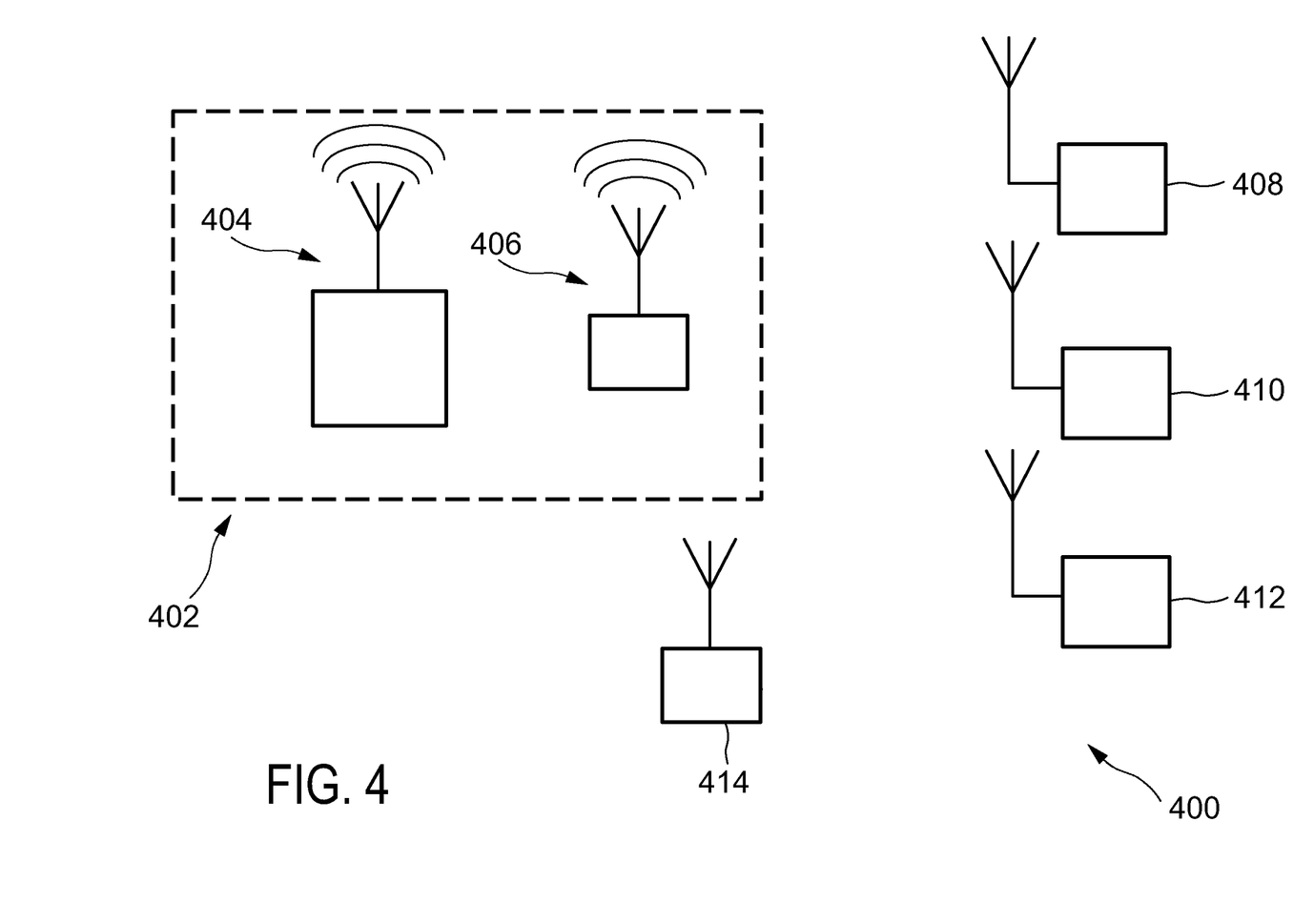
FIG. 4 shows another embodiment of a radio-power network arrangement employing "passive-WiFi" communication.

An embodiment of a radio-power network arrangement employing "passive-WiFi" communication is shown in FIG. 4. "Passive-WiFi" technology allows reducing the power consumption of the WiFi transmission based on an architecture that decouples those high power-consuming components that are analogue in nature and operate in radio frequency bands from those components that require much less power, are digital in nature and operate in a baseband frequency range.

The radio-power network arrangement 400 includes a power supply device 402 that comprises a radio-frequency-signal supply unit 404 that is configured to provide a primary power-delivering radio signal as a radio-carrier signal of a frequency outside a radio frequency band to be used for data communication within the radio-power network arrangement 400. In the case of arrangements configured to transmit according to any of the IEEE 802.11 (WiFi) standards, wherein the frequency band is for example one of the frequency bands in the 2.4 GHz and the 5 GHz range.

It is noted that in some embodiments only the radio-energy provision and harvesting is made using WiFi signals, whereas data communication is performed only using another suitable protocol such as ZigBee or Bluetooth low energy (BLE). These protocols allow achieving a particularly low energy consumption for data communication and thus help reduce the minimum energy amount required for operation. This is particularly advantageous in networks where only a low energy is made available for harvesting and power conversion.

The radio-power-supply device 402 also comprises at least one backscattering frequency modulation unit 406 which is configured to receive and modulate the received radio-carrier signal to backscatter a frequency modulated secondary power-delivering radio signal at the radio frequency band to be used for data communication within the radio-power network arrangement.

To generate communication data in the baseband and modulate it onto the shifted radio-carrier signal for IEEE 802.11.b, DSSS and CCK encoding on top of DBPSK and DQPSK modulation can be used. The encoding operation is digital in nature and hence it is suitably achieved using digital logic. To create the phase changes required for DBPSK and DQPSK, a digital square wave may be approximated as a sinusoid and its phase may be modulated by changing the timing of the square wave.

The power-delivering radio signal is received by the radio-power receiving devices 408, 410 and 412. The respective power-converters (not shown here) of the radio-power receiving devices convert the received radio-energy amount of either only the primary power-delivering radio signal or of both the primary and secondary power-delivering radio signals into the electrical operation power amount for operating the respective radio-power receiving devices.

The arrangement 400 also comprises a radio-power distribution controller 414. The receiving unit of the radio-power distribution controller 514 receives either only the primary power-delivering radio signal or both the primary and secondary power-delivering radio signal and uses it for performing its monitoring and control functions described above.

Figure 5:
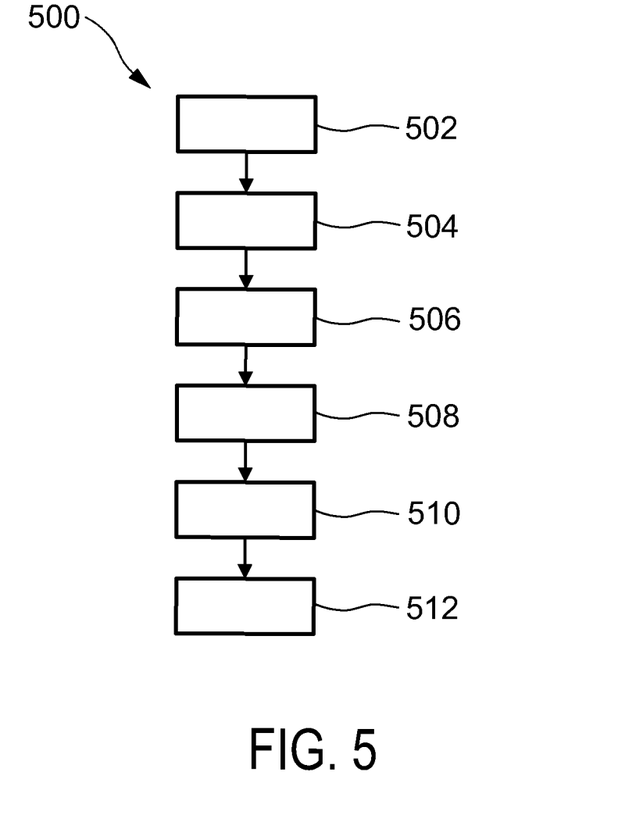
FIG. 5 shows a flow diagram of an exemplary method for operating a radio-power distribution controller in controlling far-field radio-power delivery from an external radio-power-supply device to at least one external radio-power receiving device.

FIG. 5 shows a flow diagram of an exemplary method 500 for operating a radio-power distribution controller in controlling far-field radio-power delivery from an external radio-power-supply device to at least one external radio-power receiving device. The method 500 comprises providing, for instance by holding or ascertaining, in a step 502, for a given radio-power receiving device power-requirement data indicative of a respective threshold energy amount indicative of an energy amount required by the radio-power receiving device for conversion into the electrical operation power amount Furthermore, the radio-power distribution controller receives, in a step 504 the power-delivering radio signal and determines, in a step 506, a duration of the received power-delivering radio signal. Additionally, in a step 508, the radio-power distribution controller determines, using the determined duration, an estimate of a received radio-energy amount, which has been received by the radio-power receiving device with the power-delivering radio signal during its duration. Upon determining, in a step 510, that the estimate of the received radio-energy amount is below the threshold energy amount, the radio-power distribution controller provides, in a step 512, a radio-power-shortage signal. The radio-power-shortage signal may include a power control message instructing the external radio-power-supply device to provide additional radio power to the at least one external radio-power receiving device.

In summary, a radio-power distribution controller for controlling far-field radio-power delivery from an external radio-power-supply device to at least one external radio-power receiving device that has a power-converter for converting a received radio-energy amount into an electrical operation power amount for operating the radio-power receiving device is provided and comprises a radio-power monitoring unit, which is configured to determine a duration of the received power-delivering radio signal and to determine, an estimate of a received radio-energy amount, which has been received by the radio-power receiving device. Upon determining that the estimate of the received radio-energy amount is below a threshold energy amount, it provides a radio-power-shortage signal.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A radio-power distribution controller for controlling far-field radio-power delivery from an external radio-power-supply device to at least one external radio-power receiving device that has a power-converter for converting a received radio-energy amount into an electrical operation power amount for operating the radio-power receiving device, the radio-power distribution controller comprising:
   a power-requirement unit, which is configured to hold or ascertain for a given radio-power receiving device power-requirement data indicative of a respective threshold energy amount indicative of a minimum energy amount required by the radio-power receiving device for conversion into the electrical operation power amount; and
   a radio-power monitoring unit, which is configured:
      to receive a power-delivering radio signal provided by the external radio-power-supply device;
      to determine a duration of the received power-delivering radio signal; and
      to determine, using the determined duration, an estimate of a received radio-energy amount, which has been received by the radio-power receiving device with the power-delivering radio signal during its duration; and
   to provide a radio-power-shortage signal upon determining that the estimate of the received radio-energy amount is below the threshold energy amount.

2. The radio-power distribution controller of claim 1, wherein
   the power-requirement data is further indicative of an threshold aggregated energy amount to be received by the respective radio-power receiving device in a predetermined energy-harvesting time span, the threshold aggregated energy amount being sufficient for operating the radio-power receiving device over a predetermined operational time span; and the radio-power monitoring unit is configured to provide the radio-power-shortage signal also upon determining that the estimate of the received radio-energy amount is below the threshold aggregated energy amount.

3. The radio-power distribution controller of claim 1, wherein the radio power monitoring unit is configured to determine, during the reception of the power-delivering-radio signal, a time-integrated received radio-energy amount and to provide the radio-power-shortage signal as long as the time-integrated received radio-energy amount is below the threshold energy amount, and to stop providing the radio-power shortage signal upon determining that the time-integrated received radio-energy amount has reached the threshold energy amount.

4. The radio-power distribution controller of claim 1, wherein the radio power monitoring unit is configured to provide the radio-power-shortage signal upon determining that the power-delivering radio signal has not exceeded a predetermined minimum duration.

5. The radio-power distribution controller of claim 1, wherein the power requirement data held by the power requirement unit allocates different required radio-power amounts to different times of operation of the radio-power receiving device, and wherein the power requirement unit is configured to provide that power requirement data which is allocated to the current time.

6. The radio-power distribution controller of claim 1, further comprising
a transmitter unit, which is configured to transmit control messages to the external radio-power-supply device via a communication interface; and
a control unit which is configured, upon reception of the radio-power-shortage signal, to generate and provide to the transmitter unit the radio-power shortage signal including a power control message instructing the external radio-power-supply device to provide additional radio power to the to at least one external radio-power receiving device.

7. The radio-power distribution controller of claim 1, further comprising a backup radio-power-supply unit configured to provide, upon provision of the radio-power-shortage signal, a backup radio-energy amount to the external radio-power receiving device via an air interface.

8. The radio-power distribution controller of claim 1, further comprising
a power-supply unit, which is configured to receive electrical power via a wired power network;
wherein the radio-power distribution controller is configured to be operated using the received electrical power.

9. The radio-power distribution controller of claim 8, further comprising an application unit configured to perform an application function and to be operated using the received electrical power.

10. A radio-power network arrangement comprising
at least one radio-power receiving device, which comprises a receiver configured to receive a power-delivering radio signal; and a power-converter for converting a received radio-energy amount into an electrical operation power amount for operating the radio-power receiving device;
a radio-power-supply device for providing the power-delivering radio signal to the at least one radio-power receiving device;
a radio-power distribution controller according to claim 1, which is arranged remotely from the radio-power-supply device and from the at least one radio-power receiving device.

11. The radio-power network arrangement of claim 10, wherein
the radio-power-supply device further comprises:
a radio-power delivery unit configured to generate and transmit the power-delivering radio signal comprising radio energy of a controllable amount; and
a radio-power control unit configured to control the amount of radio energy in response to a control message received from the radio-power distribution controller by modifying a radio-power level provided by the power-delivering radio signal or a duration of the power-delivering radio signal or a frequency range covered by the power-delivering radio signal.

12. The radio-power network arrangement of claim 10, wherein the radio-power-supply device comprises:
a radio-frequency-signal supply unit configured to provide a primary power-delivering radio signal as a radio-carrier signal of a frequency outside a radio frequency band to be used for data communication within the radio-power network arrangement; and
a backscattering frequency modulation unit configured to:
receive and modulate the received radio-carrier signal to backscatter a frequency modulated secondary power-delivering radio signal at the radio frequency band to be used for data communication within the radio-power network arrangement; wherein
the receiving unit of the radio-power distribution controller is configured to receive either only the primary power-delivering radio signal or both the primary and secondary power-delivering radio signal; and wherein
the power-converter of the at least one radio-power receiving device is configured to convert the received radio-energy amount of either only the primary power-delivering radio signal or both the primary and secondary power-delivering radio signal into the electrical operation power amount for operating the radio-power receiving device.

13. The radio-power network arrangement of claim 10, wherein the at least one radio-power receiving device comprises a baseband modulation unit, which is connected to the receiver and configured to modulate the secondary power-delivering radio signal using a baseband signal provided internally; and wherein the receiver is further configured to backscatter the modulated secondary power-delivering radio signal.

14. A method for operating a radio-power distribution controller in controlling far-field radio-power delivery from an external radio-power-supply device to at least one external radio-power receiving device that has a power-converter for converting a received radio-energy amount into an electrical operation power amount for operating the radio-power receiving device, the method comprising:
providing, for a given radio-power receiving device, power-requirement data indicative of a respective threshold energy amount indicative of an energy amount required by the radio-power receiving device for conversion into the electrical operation power amount;
receiving a power-delivering radio signal provided by the external radio-power-supply device;
determining a duration of the received power-delivering radio signal;
determining, using the determined duration, an estimate of a received radio-energy amount, which has been received by the radio-power receiving device with the power-delivering radio signal during its duration; and upon determining that the estimate of the received radio-energy amount is below the threshold energy amount, providing a radio-power-shortage signal.

15. A computer program comprising executable code for executing the method of claim 14 when executed by a processor of a computer.

\* \* \* \* \*